United States Patent
Yan et al.

(10) Patent No.: US 12,552,718 B2
(45) Date of Patent: Feb. 17, 2026

(54) SOLID-PHASE-SINTERED SILICON CARBIDE ARTICLE AND PREPARATION METHOD THEREOF

(71) Applicant: Nantong Sanzer Precision Ceramics Co., Ltd., Jiangsu (CN)

(72) Inventors: Yongjie Yan, Jiangsu (CN); Ruikang Zhao, Jiangsu (CN)

(73) Assignee: Nantong Sanzer Precision Ceramics Co., Ltd., Jiangsu (CN)

( * ) Notice: Subject to any disclaimer, the term of this patent is extended or adjusted under 35 U.S.C. 154(b) by 958 days.

(21) Appl. No.: 17/738,415

(22) Filed: May 6, 2022

(65) Prior Publication Data

US 2023/0134960 A1 May 4, 2023

Related U.S. Application Data

(63) Continuation of application No. PCT/CN2022/081095, filed on Mar. 16, 2022.

(30) Foreign Application Priority Data

Nov. 4, 2021 (CN) .......................... 202111302454.0

(51) Int. Cl.
  C04B 35/565 (2006.01)
  C04B 35/626 (2006.01)
  C04B 35/638 (2006.01)
  C04B 35/64 (2006.01)

(52) U.S. Cl.
  CPC ........ *C04B 35/565* (2013.01); *C04B 35/6264* (2013.01); *C04B 35/6266* (2013.01); *C04B 35/62695* (2013.01); *C04B 35/638* (2013.01); *C04B 35/64* (2013.01); *C04B 2235/3826* (2013.01); *C04B 2235/424* (2013.01); *C04B 2235/606* (2013.01); *C04B 2235/6567* (2013.01)

(58) Field of Classification Search
  CPC .. C04B 35/565–5755; C04B 2235/424; C04B 35/62695; C04B 35/63–6365; C04B 2235/606
  See application file for complete search history.

(56) References Cited

U.S. PATENT DOCUMENTS 5,702,997 A * 12/1997 Dynan .................. C04B 35/565 501/88
2012/0086153 A1* 4/2012 Kudo ...................... H05B 6/80 264/432

FOREIGN PATENT DOCUMENTS

| CN | 101560104 | A |   | 10/2009 |   |            |
|----|-----------|---|---|---------|---|------------|
| CN | 105461306 | A |   | 4/2016  |   |            |
| CN | 107793158 | A | * | 3/2018  |   | C04B 38/068 |
| CN | 108395248 | A |   | 8/2018  |   |            |
| CN | 109467446 | A | * | 3/2019  |   | C04B 35/563 |
| CN | 110204338 | A |   | 9/2019  |   |            |
| CN | 112811907 | A | * | 5/2021  |   | C04B 35/62695 |
| CN | 113831136 | A |   | 12/2021 |   |            |
| JP | 2001247367 | A |  | 9/2001  |   |            |
| KR | 20200113813 | A | * | 10/2020 |   | C04B 35/64 |

OTHER PUBLICATIONS

CN-107793158-A (Gong) Mar. 13, 2018 (English language machine translation). [online] [retrieved Sep. 19, 2015]. Retrieved from: Espacenet. (Year: 2018).*
CN-109467446-A (Shi) Mar. 15, 2019 (English language machine translation). [online] [retrieved Sep. 19, 2025]. Retrieved from: Espacenet. (Year: 2019).*
KR-20200113813-A (Yoo) Oct. 7, 2020 (English language machine translation). [online] [retrieved Sep. 19, 2025]. Retrieved from: Espacenet. (Year: 2020).*
CN-112811907-A (Wang) May 18, 2021 (English language machine translation). [online] [retrieved Sep. 19, 2025]. Retrieved from: Espacenet. (Year: 2021).*
CN-101560104-A (Lin) Oct. 21, 2009 (English language machine translation). [online] [retrieved Sep. 19, 2025]. Retrieved from: Espacenet. (Year: 2009).*
CN-1054613096-A (Shi) Apr. 6, 2016 (English language machine translation). [online] [retrieved Sep. 19, 2025]. Retrieved from: Espacenet. (Year: 2016).*

* cited by examiner

*Primary Examiner* — Erin Snelting
(74) *Attorney, Agent, or Firm* — Cooper Legal Group, LLC

(57) ABSTRACT

The present application relates to the field of engineering ceramic materials, and specifically discloses a solid-phase-sintered silicon carbide article and a preparation method thereof. A method for preparing a solid-phase-sintered silicon carbide article includes the following steps: grinding of raw materials: mixing a micron-scale silicon carbide powder with a boron-containing sintering aid and wet grinding to obtain a slurry; spray granulating: adding a water-soluble carbon black and a binder to the slurry, stirring evenly, and spray granulating to obtain a granulated powder of silicon carbide; mixing; ageing: ageing the wet powder obtained by mixing to obtain a aged material; post-processing: subjecting the aged material to pugging, extruding, drying and heating.

10 Claims, No Drawings

SOLID-PHASE-SINTERED SILICON CARBIDE ARTICLE AND PREPARATION METHOD THEREOF

CROSS REFERENCE TO RELATED APPLICATIONS

The present application is a continuation of PCT application No. PCT/CN2022/081095, filed on Mar. 16, 2022, which claims the priority to China patent application No. 202111302454.0, filed on Nov. 4, 2021. The entireties of PCT application No. PCT/CN2022/081095 and China patent application No. 202111302454.0 are incorporated herein by reference and made a part of this specification.

TECHNICAL FIELD

The present application relates to the field of engineering ceramic materials, and more particularly, relates to a solid-phase-sintered silicon carbide article and a preparation method thereof.

BACKGROUND

Engineering ceramics refers to the general term of all kinds of ceramics used in the field of engineering technology, including structural ceramics, functional ceramics and ceramic matrix composites. In recent years, with the advancement of science and technology and the development of industry, engineering materials have become a hot spot in the field of materials research due to their performance characteristics such as high temperature resistance, chemical corrosion resistance, wear resistance, oxidation resistance, etc. At present, the widely used engineering ceramics mainly include alumina ceramics, silicon carbide ceramics, silicon nitride ceramics and zirconia ceramics, etc.

Among them, due to excellent high temperature strength and corrosion resistance, silicon carbide ceramics can work in the environment of high temperature, high humidity, high oxygen and strong acid and alkali for a long time, and are widely used in petrochemical, metallurgical machinery, aerospace, microelectronics, automotive fields and the like. Because silicon carbide is strongly covalently bonded, the diffusion rate during sintering is low, making it difficult to sinter compactly under atmospheric pressure. Therefore, at present, pressureless sintering technology is mostly used to produce silicon carbide ceramics. Pressureless sintering can be divided into liquid phase sintering and solid phase sintering. Among them, solid phase sintering uses boron (or boron carbide) and carbon as sintering aids, and achieves dense sintering through solid phase diffusion. Compared with liquid phase sintering, the amount of sintering aids for solid phase sintering is small, and no liquid phase is generated during the sintering process. Therefore, the silicon carbide ceramics of solid phase sintering have better high temperature resistance and can be used in heat exchange tubes.

The sintering aid of carbon source used in the solid phase sintering process is generally phenolic resin. As a polymer material, phenolic resin can not only provide a carbon source, but also play the role of a binder. However, debonding is required in the preparation of silicon carbide products. In the process of debonding, due to the existence of phenolic resin, some phenols and aldehydes will be contained in the exhaust gas, which will cause environmental pollution problems and increase the cost of environmental protection treatment. In order to solve the pollution problem of phenolic resin, nano-scale carbon black can also be used as carbon source. However, owing to a strong aggregation between carbon black particles, it is difficult to disperse carbon black particles in solid powder, which increases the difficulty of processing. In addition, the cohesiveness of carbon black is not as good as that of phenolic resin, which leads to poor formability of the body and affects the performance of the product.

In a related technology, a preparation method of a silicon carbide heat exchange tube is disclosed, including batching, mixing, pugging, extrusion molding, drying, debonding and sintering at high temperature. In order to improve the uniformity inside the body, reduce the occurrence of cracks and delamination during the pressing process, an aging process is usually added between the pugging and extrusion molding. After pugging, the slip is aged and stored for a period of time, and then the slip is extruded and dried. The aged slip has a better degree of wetting, which can improve its forming performance and is conducive to a subsequent extrusion molding. However, the ageing usually has to take dozens of hours or even days, which not only prolongs the production cycle, but also causes a long interval between processes such as pugging, extrusion molding, and drying, so that they cannot be carried out continuously, being not conducive to continuous production and affecting the production efficiency.

In addition, when silicon carbide products are used in heat exchange tubes, because the heat exchange tubes are used in a high temperature and high pressure environment for a long time, they need to have a high density and strength. In order to obtain a high-performance silicon carbide article, in another related technology, the green body, after mixing, ageing, extrusion molding, and drying, is subjected to isostatic pressing, and then sintering at a high temperature. However, this technology suffers from a high cost of isostatic pressing equipment, difficult automatic production, and low production efficiency. Performing the isostatic pressing will lead to a further increase of production costs.

BRIEF SUMMARY

In view of this, the present application provides a solid-phase-sintered silicon carbide article and a preparation method thereof.

In a first aspect, the present application provides a method for preparing a solid-phase-sintered silicon carbide article, adopting the following technical solution.

A method for preparing a solid-phase-sintered silicon carbide article includes the following steps:
  Step S1, grinding of raw materials: mixing a micron-scale silicon carbide powder with a boron-containing sintering aid and wet grinding to obtain a slurry with a particle size of 0.4-0.8 µm;
  Step S2, spray granulating: adding a water-soluble carbon black and a binder to the slurry, stirring evenly, spray granulating to obtain a granulated powder of silicon carbide;
  Step S3, mixing: mixing the granulated powder of silicon carbide with a plasticizer evenly, adding a lubricant and water, and stirring evenly to obtain a wet powder;
  Step S4, ageing: ageing the wet powder to obtain an aged material; and
  Step S5, post-processing: subjecting the aged material to pugging, extruding, drying and heating.

In some embodiments, the micron-scale silicon carbide powder has a particle size of 3-10 µm.

Silicon carbide powder is the main raw material of silicon carbide products, and its purity and particle fineness affect the performance of silicon carbide ceramic products. Due to the large amount of metal impurities in silicon carbide, a manufacturer of silicon carbide powder needs to carry out acid-base purification treatment, grinding and drying to obtain a finished product of sub-micron silicon carbide powder. Then a manufacturer of ceramic directly purchases this sub-micron silicon carbide powder as the main raw material for silicon carbide ceramics, which makes the cost higher. In the above technical solution, for the silicon carbide powder in the present application, a micron-scale silicon carbide powder with a particle size of 3-10 μm is selected. The silicon carbide with this particle size has been widely used in the cutting of silicon wafers in photovoltaic industry. In recent years, photovoltaic cutting has been gradually replaced by diamond wire cutting, resulting in a large excess of silicon carbide powder with a particle size of 3-10 μm in the market. Therefore, compared with sub-micron silicon carbide, the cost of silicon carbide powder with a particle size of 3-10 μm is lower, which can reduce the cost of the main raw materials.

The present application adopts wet grinding. In the grinding process, a silicon carbide and sintering aids are mixed, so that, on the one hand, the fineness of the silicon carbide powder and sintering aids and the uniformity of mixing the two can be improved, and on the other hand, the obtained slurry after wet grinding can be directly used for subsequent spray granulating, without the need of grinding the silicon carbide powder separately and then drying, which simplifies the process and reduces the processing cost of the powder. Selection of the raw materials and combination of processes greatly reduce the cost of main raw materials.

In addition, a conventional sintering aid, that is, boron carbide, has large particle size and the amount is high, which will cause insufficient density of silicon carbide articles. For silicon carbide heat exchange tubes used in a high-pressure environment, in this case, the problem of fracture is easy to occur, which affects its performance. In the present application, a sintering aid is ground together with silicon carbide to reduce the fineness of the sintering aid of boron carbide, improve its activity, and improve the density of silicon carbide articles, thereby increasing its strength.

As a carbon source of the present application, carbon black is selected to replace a traditional carbon source of phenolic resin, eliminating the problem of tail gas treatment and thus reducing the cost of environmental protection treatment. In addition to being used as a carbon source, phenolic resin itself acts as a binder. In the present application, carbon black is used as a carbon source, while a binder and plasticizer are added to increase the strength of the silicon carbide material. In a related technology, the silicon carbide powder and sintering aid are directly mixed, however, due to an extremely strong aggregation between carbon black particles, it is difficult to disperse silicon carbide powder in a solid powder. Therefore, in the present application, a water-soluble carbon black is added to the slurry after grinding, which can improve the dispersibility of carbon black.

In the process of the present application, the obtained wet powder is first subjected to a ageing, and then to pugging, extruding, drying, debonding, and sintering. Different from a traditional process including firstly pugging and then ageing, extruding, drying, etc., the order of ageing in the process is modified in the present application.

In the production of ceramics, pugging is adopted to remove air and provide a more uniform structure of slip, which is beneficial to improve the plasticity and compactness of the slip. Ageing is adopted to make the interior of the green body uniform to reduce cracks during pressing. After ageing, a higher degree of wetting can be achieved and the forming properties of the slip can be improved. In contrast, in a related technology, the slip is generally extruded and cured after being aged and stored for dozens of hours. However, the inventors found that when the slip material is aged after pugging, the drying speeds on the slip material surface and inside the slip material are inconsistent, so that the surface of the slip material tends to harden to form hard particles. In the present application, the wet powder is aged firstly, so that the wet powder gains a better wettability, preventing the surface of the slip from hardening to form hard particles and improving the uniformity and plasticity of the slip, which is beneficial to improve the plasticity of the slip in the pugging process and density upon sintering. In addition, in the present application, first ageing of the wet powder and then continuous pugging, extruding, and curing shorten the intermittent pause in subsequent processes, achieve a continuous process of pugging, extruding, and drying, and thus improves production efficiency greatly and reduces production costs.

In some embodiments, an amount of the boron-containing sintering aid is 0.2-0.5 wt % based on a weight of the micron-scale silicon carbide powder. An amount of the water-soluble carbon black is 0.5-3.0 wt % based on the weight of the micron-scale silicon carbide powder.

In the present application, the silicon carbide raw material is not subjected to an additional acid-base washing process, therefore, a content of free silicon and silicon dioxide in the raw material will increase, which will affect the performance of the product. In order to solve this problem, carbon black in the present application is subjected to a carbothermal reduction reaction to react with free silicon and silicon dioxide to generate silicon carbide, so as to reduce the impurity content and improve the product quality.

The sintering aid of boron source is usually a boron carbide or a boron powder. In the present application, the sintering aid of boron source is directly added during the grinding process, which can provide the sintering aid with smaller particle size more uniform dispersion. Taking boron carbide as an example, when the silicon carbide is ground, a boron carbide is added for co-grinding, so that the boron carbide can reach a particle size of sub-micron level, and the activity can be greatly increased. Therefore, the amount of the boron carbide can be reduced to 0.2-0.5% from the currently commonly used 0.6-1.0%, which greatly reduces the amount of sintering aids, thereby reducing the cost of sintering aids.

In some embodiments, the plasticizer includes or consists of a high molecular weight plasticizer with a molecular weight of 150,000-200,000 and a low molecular weight plasticizer with a molecular weight of 4000-6000.

By adopting the above technical solution, the present application solves a pollution problem caused by a traditional phenolic resin by using carbon black in replace of phenolic resin. However, in addition to being a carbon source, the phenolic resin itself also acts as a binder. Compared with a method using phenolic resin, in the present application, in spite the addition of a binder, a binding effect of the binder is limited, which will reduces the formability of a plain body. Therefore, the present application makes an improvement to the plasticizer by combining a high molecular weight plasticizer with a low molecular weight plasticizer, which cooperates with the pugging process to improve the plasticity and compactness of silicon carbide articles, thereby improving the problem of insufficient strength in the absence of phenolic resin.

In some embodiments, a temperature for ageing is 5-10° C., a humidity for ageing is 40-50%, and a time for ageing is 12-24 h.

A traditional process usually ages the slip material in an environment with a temperature of 20-40° C. and a humidity of 80-90%. In the present application, ageing is performed in a low-temperature and medium-humid environment. On one hand, this can improve the uniformity of mixing the components of the slip material, and avoid affecting subsequent processes such as pugging due to an excessive viscosity of the system. On the other hand, the low-temperature and medium-humid environment is also beneficial to the bonding of the plasticizer in the present application, which can improve the formability of the articles.

In some embodiments, the drying includes a primary drying and a secondary drying. The primary drying is far-infrared drying, a temperature for the primary drying is 80-100° C., and a material conveying speed is 0.5-1 m/min.

A traditional curing and drying process often uses microwave curing. Microwave curing simultaneously cures interior and exterior of the material by a relatively rapid curing and drying speed, but tends to lead to delamination of ceramic articles. In the above technical solution, a far-infrared curing and drying technology is adopted, which only dries the surface of the material to shape the surface, and, in combination with a subsequent slow drying, eliminates the phenomenon of delamination of ceramic articles. It is beneficial to improve the internal uniformity and compactness of the article and improve its mechanical properties.

In some embodiments, the secondary drying is hot air drying, a temperature for the secondary drying is 120-150° C., and a time for the secondary drying is 15-20 h.

In the above technical solution, after curing the material to shape the surface, the hot air drying can slowly dry the interior of the material, which is beneficial to reduce the phenomenon of delamination of ceramic articles and improve the mechanical properties of the articles.

In some embodiments, the heating includes debonding, carbothermal reduction and sintering at high temperature;
a temperature for the carbothermal reduction is 1400-1600° C., and a holding time for the carbothermal reduction treatment is 0.5-2 h.

In some embodiments, the heating includes the following steps:
debonding: heating the material to 600-900° C. and holding for 1-3 h;
carbothermal reduction: heating the material after the debonding to 1400-1450° C., then heating to 1550-1600° C. at a rate of 0.5-2° C./min, and holding for 0.5-2 h at a temperature of 1550-1600° C.; and
sintering at high temperature: heating the material after the carbothermal reduction to 1950-2150° C., and holding for 2-3 h.

In a related technology, the heating of materials generally includes two temperature zones, namely debonding zone and sintering at high temperature zone, while the heating of the present application can be performed in three temperature zones:
debonding zone: heating the material to 600-900° C., and performing debonding to remove polymer aids;
carbon reduction zone: after debonding, heating the material to 1400-1450° C., then heating to 1550-1600° C. at a rate of 0.5-2° C./min, and maintaining this temperature to promote reduction of carbon, so that carbon reacts with free silicon and silicon dioxide on a surface of the silicon carbide powder to generate silicon carbide, reduce the content of impurities, and fully complete the reduction reaction of carbon, thereby improving sintering performance and obtaining high-density products; and
sintering zone: sintering at a temperature of 1950-2150° C. Since the boron carbide of the present application has small particle size and low content, the temperature for sintering can be reduced by 30-50° C. compared with that for a traditional sintering, under the premise of satisfying the requirement of sintering self-densification.

In some embodiments, the spray granulating adopts a centrifugal spray granulation, an inlet temperature is 220-230° C., and an outlet temperature is 95-100° C.

In a second aspect, the present application provides a silicon carbide article prepared by the method for preparing a solid-phase-sintered silicon carbide article.

To sum up, the present application has the following beneficial effects:

1. Low cost of main raw materials: the present application uses the silicon carbide micro-powder for cutting from commercial inventory as the raw material, and the cost of the silicon carbide powder is low. Compared with currently commonly used sub-micron silicon carbide as the raw material, the present application eliminates the need of additionally performing acid-base purification, grinding, and drying on the silicon carbide raw powder by a raw silicon carbide powder supplier. Further, in the present application, directly using the micron-scale silicon carbide raw powder as the raw material and directly wet-grinding the raw powder into a sub-micron-scale powder for use in subsequent processing save the acid-base purification procedure and the drying procedure, which can reduce the processing cost of the powder, thereby greatly reducing the cost of preparing the main raw material.

2. Low cost of sintering aids: in the present application, the sintering aid of boron source is directly added during the grinding process, which can make the particle size of the sintering aid smaller and the dispersion more uniform, improve the activity of the sintering aid of boron source, and reduce its amount, thereby reducing the cost of sintering aids. Carbon black is selected as the sintering aid of carbon source of the present application. Compared with the carbon source of phenolic resin, it is less likely to generate polluting gas during debonding, thereby reducing the cost of environmental protection.

3. High production efficiency: the preparation method of the present application is first subjected to ageing, and then undergoes processes such as pugging, extruding, and drying, which is different from the traditional processes such as firstly pugging, followed by ageing, extruding, and drying. It modifies the order of the ageing process in the process, thereby shortening the intermittent pause in subsequent procedures, realizing a continuous process of pugging, extruding and drying processes, and greatly improving the production efficiency.

4. High article performance: In the present application, when the silicon carbide is ground, a boron carbide is added for co-grinding, so that the fineness and activity of the sintering aid of boron source are improved, which is beneficial to promote solid-phase sintering, improve the density of silicon carbide products, and increase its strength.

The present application uses carbon black as a sintering aid and a plasticizer obtained by compounding a high molecular weight plasticizer and a low molecular weight plasticizer, which, in combination with the pugging process, can improve the plasticity and compactness of silicon carbide products, thereby addressing the problem of insufficient strength in the absence of phenolic resin;

In the preparation method of the present application, the wet powder is first aged. Since the wet powder has better wettability, the surface of the slip is not easy to harden to produce hard particles, which can improve the uniformity and plasticity of the slip, being beneficial to improve the plasticity of the slip in the pugging process and the density during sintering.

The drying technology of the present application adopts a combination of far-infrared curing and drying and hot air drying. Compared with the traditional microwave curing and drying, the far-infrared curing and drying technology adopted in the present application only dries the surface of the material to shape the surface, which, in combination with subsequent slow drying, can eliminate delamination of ceramic articles and facilitate improving the mechanical properties of the articles as well as mechanical properties thereof.

Compared with the traditional heat treatment process that only contains the debonding zone and the sintering zone, the heat treatment of the present application further introduces a carbon reduction zone. By maintaining the temperature at 1400-1600° C., the thermal reduction of carbon can be promoted, so that the carbon reacts with the free silicon and silicon dioxide on the surface of the silicon carbide powder to generate silicon carbide, so as to reduce the impurity content and provide a more complete reduction of carbon, thereby improving the sintering performance and obtaining high-density products.

5. Wide application of articles: The silicon carbide articles prepared by the preparation method of the present application are widely used, for example, for preparing heat exchange tubes, roller bars, square beams, and micro-reaction tubes. The sintering density of the silicon carbide extrusion articles prepared by the process of the present application can reach a density of 3.10 g/cm$^3$ or higher, at most 3.16 g/cm$^3$, which greatly improves the performance of the solid-phase-sintered silicon carbide extrusion article.

DETAILED DESCRIPTION

A method for preparing a solid-phase-sintered silicon carbide article includes the following steps:

Step S1. Batching: using a micron-scale silicon carbide powder with a particle size of 3-10 μm as the main raw material, and using a boron-containing sintering aid with a particle size of 3-10 μm and a water-soluble carbon black as solid phase sintering aids; using a binder, a plasticizer and a lubricant as functional aids. In particular, the amount of the boron-containing sintering aid is 0.2-0.5 wt % based on the weight of the micron-scale silicon carbide powder, and the amount of the water-soluble carbon black is 0.5-3 wt % based on the weight of the micron-scale silicon carbide powder; the amount of the binder is 0.5-2 wt % based on the weight of the micron-scale silicon carbide powder; the plasticizer consists of a high molecular weight plasticizer with a molecular weight of 150,000-200,000 and a low molecular weight plasticizer with a molecular weight of 4000-6000, the weight ratio of the high molecular weight plasticizer and the low molecular weight plasticizer is 1:1-4;

Step S2. Grinding of raw materials: putting the micron-scale silicon carbide powder and the boron-containing sintering aid into a vertical or horizontal grinding machine firstly, and grinding them with water as a solvent to obtain a slurry with a particle size of 0.4-0.8 μm and a solid content of 40-50 wt %;

Step S3. Spray granulating: adding a water-soluble carbon black and a binder to the slurry, stirring evenly, then performing a centrifugal spray granulation to obtain a granulated powder of silicon carbide, in which an inlet temperature is 220-230° C., and an outlet temperature is 95-100° C.;

Step S4. Mixing: mixing the granulated powder of silicon carbide and a plasticizer in a mixer evenly, then adding deionized water and a lubricant, and stirring evenly to obtain a wet powder, in which an amount of plasticizer is 4-10 wt % based on the weight of the granulated powder of silicon carbide; an amount of the deionized water is 15-25 wt % based on the weight of the granulated powder of silicon carbide; and the amount of the lubricant is 1-2 wt % based on the weight of the granulated powder of silicon carbide;

Step S5. ageing: under the conditions of sealing, temperature of 5-10° C. and humidity of 40-50%, ageing the wet powder for 12-24 hours to obtain an aged material;

Step S6. pugging: pugging the aged material for 20-30 min under the conditions of temperature of 20-30° C., pressure of 1.0-1.5 MPa and vacuum degree of −0.08-0.1 MPa, and repeating pugging for 3-5 times to obtain a pugged slip material;

Step S7. Extruding: extruding the pugged slip material in a extrusion molding machine under the conditions of extrusion pressure of 1.0-1.5 MPa, vacuum degree of −0.08-0.1 MPa, and extrusion rate of 0.5-1 m/min; and then performing a synchronous fixed-length cutting with synchronous speed measurement to obtain a plain body;

Step S8. Drying: performing a primary drying on the plain body directly in a far-infrared dryer with gas suspension, in which a length of a drying working area is 2-4 m, a temperature for the drying is 80-100° C., and a material conveying speed is 0.5-1 m/min; and then subjecting the plain body to a secondary drying in a tubular drying furnace or a hot air drying oven with gas suspension to obtain a dried plain body of silicon carbide, in which a temperature for the drying is 120-150° C., and a time for the drying is 15-20 h;

Step S9. Heating: placing the dried plain body of silicon carbide in a resistance furnace with high temperature, and heating under the protection of an argon atmosphere, which includes debonding, carbothermal reduction and sintering, debonding: raising the temperature of the resistance furnace to 300° C. at a rate of 2-4° C./min, then heating to 600-650° C. at a rate of 0.5-1° C./min, then heating to 850-900° C. at a rate of 1-2° C./min, and holding for 1-3 h at the temperature of 850-900° C.;

carbothermal reduction: raising the temperature to 1400-1450° C. at a rate of 2-4° C./min, then heating to 1550-1600° C. at a rate of 0.5-2° C./min, and holding for 0.5-2 h at the temperature of 1550-1600° C.; and sintering at a high temperature: raising the temperature to 1950° C. at a rate of 2-4° C./min, then heating to 2050-2150° C. at a rate of 1-2° C./min, and holding for 2-3 h to obtain a sintered article; and Step S10. Finishing: subjecting the sintered article to finishing to obtain a silicon carbide article, in which the finishing includes cutting, inner and outer chamfering, etc., The method of the present application can be applied to prepare silicon carbide heat exchange tubes, silicon carbide rollers, silicon carbide square beams, silicon carbide micro-reaction tubes, and the like.

A silicon carbide heat exchange tube with an outer diameter of 14 mm and a wall thickness of 1.5 mm prepared by the method of the present application can achieve a pass rate of more than 98% under the water pressure test condition of 200 BAR, in which the pass rate refers to a ratio of samples without cracks, deformation and other defects to total test samples. A silicon carbide heat exchange tube with an outer diameter of 25 mm and a wall thickness of 3.0 mm prepared by the method of the present application can withstand a temperature of more than 1500° C. A silicon carbide rollers and square beams with an outer diameter of 38 mm and a wall thickness of 5.0 mm prepared by the method of the present application can achieve a pass rate of more than 98% under a concentrated force test of 100 MPa. A micro-reaction tube with an outer diameter of 6 mm and a wall thickness of 0.5 mm prepared by the method of the present application can withstand a pressure of 150 BAR or higher.

The present application will be further described in detail below in connection with the examples.

The raw materials in the examples are all commercially available. In particular, the silicon carbide powder has a particle size of 3-10 μm, a purity of more than 98.5%, and a content of metallic iron as impurity of less than 0.1%. The boron-containing sintering aid can be selected from boron or boron carbide. Boron carbide with a particle size of 3-10 μm is selected as the boron-containing sintering aid in the following examples. The water-soluble carbon black is purchased from ORION, Germany, under a model number of SPECIAL BLACK 6. The binder is polyvinyl alcohol, purchased from Anhui Wanweifuxin Materials Co., Ltd., under a model number of PVA26-99. The lubricant can be selected from Oleic acid or glycerin. In the following examples, glycerin is selected as the lubricant. The plasticizer consists of a high molecular weight plasticizer with a molecular weight of 150,000-200,000 and a low molecular weight plasticizer with a molecular weight of 4000-6000. The high molecular weight plasticizer can be polyethylene oxide with a molecular weight of 200,000, hydroxypropyl methyl cellulose with a molecular weight of 150,000 or 200,000, and the low molecular weight plasticizer can be polyethylene glycol with a molecular weight of 4000 or 6000, and hydroxypropyl methyl cellulose with a molecular weight of 5,000. The plasticizers used in the following examples are all polyethylene oxide with a molecular weight of 200,000 and hydroxypropyl methyl cellulose with a molecular weight of 5,000.

EXAMPLE

Examples 1-8

The amount of each raw material in Examples 1-8 is shown in Table 1. As shown in Table 1, the main difference among Examples 1-8 lies in the ratio of raw materials.

Example 1 is taken as an example for description below.

The method for preparing the silicon carbide product provided by Example 1 is as follows:

Step S1, grinding of raw materials: 100 kg of micron silicon carbide powder and 0.3 kg of boron carbide powder were putted into a vertical grinding machine, and then ground with water as a solvent to obtain a slurry with a particle size of 0.4-0.8 μm and a solid content of 45 wt % material;

Step S2, spray granulating: 1 kg of water-soluble carbon black and 1 kg of binder were added to the slurry obtained in S1, stirred evenly, and centrifugally spray granulated to obtain a granulated powder of silicon carbide, in which an inlet temperature was 225° C., and an outlet temperature was 98° C.;

Step S3, mixing: 100 kg of the granulated powder of silicon carbide obtained in S2 was taken and added to the mixer, then 4 kg of plasticizer was added, the mixer was started to mix the two evenly, 20 kg of deionized water and 1.5 kg of lubricant were added, then they were stirred evenly to obtain a wet powder;

Step S4, ageing: under the conditions of sealing, temperature of 5° C. and humidity of 40%, the wet powder was aged for 24 hours to obtain an aged material;

Step S5, pugging: the aged material was pugged for 25 minutes under the conditions of temperature of 25° C., pressure of 1.0 MPa, and vacuum degree of −0.08 MPa, and repeated pugging for 4 times to obtain a pugged slip material;

Step S6, extruding: the pugged slip material was extruded and formed under the conditions of extrusion pressure of 1.0 MPa, vacuum degree of −0.08 MPa, and extrusion rate of 0.5 m/min, then it was synchronously fixed-length cut with synchronous speed measurement to obtain a plain body;

Step S7, drying: a primary drying was directly performed to the plain body in a far-infrared dryer with gas suspension, in which the length of the drying working area was 4 m, the temperature for the primary drying was 80° C., and the material conveying speed was 1 m/min; then the above plain body was subjected to a secondary drying in a hot air drying oven to obtain a dried plain body of silicon carbide, in which the temperature for the secondary drying was 120° C., and the time for the secondary drying was 20 h;

Step S8, heating: the dried plain body of silicon carbide was putted in a resistance furnace with high temperature, and subjected to heating under the protection of argon atmosphere, which included debonding, carbothermal reduction and sintering;

debonding: the temperature of the resistance furnace with high temperature was raised to 300° C. at a rate of 3° C./min, then to 600° C. at a rate of 0.6° C./min, and then to 900° C. at a rate of 1.5° C./min, held for 2 h at the temperature of 900° C.;

carbothermal reduction: the carbothermal reduction included the following steps: the temperature was further raised to 1400° C. at a rate of 2° C./min, then to 1550° C. at a rate of 0.5° C./min, and held for 2 h at the temperature of 1550° C.;

sintering at high temperature: then the temperature was further raised to 1950° C. at a rate of 3° C./min, then to 2100° C. at a rate of 1.5° C./min, and held for 2.5 h at the temperature of 2100° C. to obtain a sintered article; and Step S9, finishing: the sintered article was subjected to a finishing to obtain a silicon carbide heat exchange tube with an outer diameter of 14 mm and a wall thickness of 1.5 mm, in which the finishing included cutting and inner and outer chamfering.

TABLE 1

Table of the amount of raw materials in Examples 1-8 (unit: kg)

| raw materials | | Examples | | | | | | | |
|---|---|---|---|---|---|---|---|---|---|
| | | Example 1 | Example 2 | Example 3 | Example 4 | Example 5 | Example 6 | Example 7 | Example 8 |
| | | | | | amount | | | | |
| silicon carbide | | 100 | 100 | 100 | 100 | 100 | 100 | 100 | 100 |
| boron carbide | | 0.3 | 0.2 | 0.5 | 0.3 | 0.3 | 0.3 | 0.3 | 0.3 |
| water-soluble carbon black | | 2 | 0.5 | 3 | 1 | 1 | 1 | 1 | |
| binder | polyvinyl alcohol | 1 | 1 | 1 | 1 | 1 | 1 | 1 | 1 |
| plasticizer | high molecular weight plasticizer | 0 | 0 | 0 | 0 | 4 | 2 | 0.8 | 0.6 |
| | low molecular weight plasticizer | 4 | 4 | 4 | 10 | 0 | 2 | 3.2 | 3.4 |
| lubricant | glycerin | 1.5 | 1.5 | 1.5 | 1.5 | 1.5 | 1.5 | 1.5 | 1.5 |
| deionized water | | 20 | 20 | 20 | 20 | 20 | 20 | 20 | 20 |

Examples 9-16

The raw materials and the amount thereof in Examples 9-16 were the same as those in Example 6, except for the process steps and process parameters.

Example 9

The difference of this Example from Example 6 lied in that, in S4, under the conditions of sealing, temperature of 10° C. and humidity of 50%, the wet powder was aged for 12 hours to obtain an aged material.

Example 10

The difference of this Example from Example 6 lied in that, in S4, under the conditions of sealing, temperature of 20° C. and humidity of 80%, the wet powder was aged for 24 hours to obtain an aged material.

Example 11

The difference of this Example from Example 6 lied in that, in S7, the plain body was directly sent to the far-infrared dryer with gas suspension for a primary drying, the temperature for the primary drying was 100° C., and the material conveying speed was 0.5 m/min; and then the above plain body was subjected to a secondary drying in a hot air drying oven to obtain a dried plain body of silicon carbide, in which the temperature for the secondary drying was 150° C., and the time for the secondary drying was 15 h.

Example 12

The difference of this Example from Example 6 lied in that, in S7, the primary drying was microwave drying, the frequency of the microwave drying was 2450 MHZ, the temperature for the primary drying was 90° C., and the time for the primary drying was 20 min; and the secondary drying was hot air drying, in which the temperature for the secondary drying was 120° C., and the time for the secondary drying was 12 h.

Example 13

The difference of this Example from Example 6 lied in that, in S7, the above plain body was dried in a hot air drying oven to obtain a dried plain body of silicon carbide, in which the temperature for the drying was 120° C., and the time for the drying was 20 h.

Example 14

The difference of this Example from Example 6 lied in that, in S8, the carbothermal reduction included the following steps: the temperature was further heated to 1500° C. at a rate of 4° C./min, then to 1600° C. at a rate of 2° C./min, and held for 0.5 h at the temperature of 1600° C.

Example 15

The difference of this Example from Example 6 lied in that, in S8, the carbothermal reduction included the following steps: the temperature was further heated to 1400° C. at a rate of 2° C./min, then to 1550° C. at a rate of 3° C./min, and held for 2 h at the temperature of 1550° C.

Example 16

The difference of this Example from Example 6 lied in that, in S8, the heating only included debonding and sintering at high temperature, and the specific steps were as follows:
debonding: the temperature of the high temperature resistance furnace was raised to 300° C. at a rate of 3° C./min, then to 600° C. at a rate of 0.6° C./min, and then to 900° C. at a rate of 1.5° C./min, and held for 2 h at the temperature of 900° C.;
sintering at high temperature: then the temperature was further heated to 1950° C. from 900° C. at a rate of 3° C./min, then to 2100° C. at a rate of 1.5° C./min, and held for 2.5 h at the temperature of 2100° C. to obtain a sintered article.

COMPARATIVE EXAMPLE

Comparative Example 1

The difference of this Comparative Example from Example 1 lied in S4, S5, S6, S7, S8, and other steps and process parameters were the same as in Example 1; and the order of ageing and pugging was exchanged, in particular:

S4, pugging: the wet powder obtained in S3 was pugged for 25 minutes for 4 times under the conditions of temperature of 25° C., pressure of 1.0 MPa, and vacuum degree of −0.08 MPa, to obtain a pugged slip material;

S5, ageing: under the conditions of sealing, temperature of 20° C. and humidity of 80%, the pugged slip material was aged for 24 hours to obtain an aged material;

S6, extruding: the pugged slip material was extruded and formed under the conditions of extrusion pressure of 1.0 MPa, vacuum degree of −0.08 MPa, and extrusion rate of 0.5 m/min, then it was synchronously fixed-length cut with synchronous speed measurement to obtain a plain body;

S7, drying: a primary drying was performed to the plain body in the microwave dryer, in which the frequency of the microwave drying was 2450 MHZ, the temperature for the primary drying was 90° C., and the time for the primary drying was 20 min; and the secondary drying, that is, a hot air drying, was performed, in which the temperature for the secondary drying was 120° C., and the time for the secondary drying was 12 h;

S8, heating: the dried plain body of silicon carbide was putted in a high temperature resistance furnace, and subjected to a heating under the protection of argon atmosphere, which included debonding and sintering;

debonding: the temperature was raised to 300° C. at a rate of 3° C./min, then to 600° C. at a rate of 0.6° C./min, and then to 900° C. at a rate of 1.5° C./min, and held for 2 h at the temperature of 900° C.;

sintering at high temperature: then the temperature was further heated to 1950° C. from 900° C. at a rate of 3° C./min, then to 2100° C. at a rate of 1.5° C./min, and held for 2.5 h at the temperature of 2100° C. to obtain a sintered article.

Comparative Example 2

The difference of this Comparative Example from Example 6 lied in S4, S5, and other steps and process parameters were the same as in Example 6; and the order of ageing and pugging was exchanged, in particular:

S4, pugging: the wet powder obtained in S3 was pugged for 25 minutes for 4 times under the conditions of temperature of 25° C., pressure of 1.0 MPa, and vacuum degree of −0.08 MPa, to obtain a pugged slip material; and S5, ageing: under the conditions of sealing, temperature of 5° C. and humidity of 40%, the pugged slip material was aged for 24 hours to obtain an aged material; and the aged material was subjected to the same extruding, drying, heating and finishing as in Example 6.

Performance Test

According to the method in the industry standard JCT2212-2014 "Silicon Carbide Ceramic Heat Exchange Tubes of Solid Phase Sintered in Atmospheric Pressure", the performance of the silicon carbide heat exchange tubes prepared in examples 1-16 and comparative examples 1-2 was tested. The results are shown in Table 2.

TABLE 2

Table of performance test of silicon carbide heat exchange tubes of Examples 1-16 and Comparative Examples 1-2

|  | bulk density, g/cm | vickers hardness, GPa | fracture toughness, MPa·m$^{1/2}$ | flexural strength (room temperature), MPa | radial compressive strength (room temperature), MPa |
|---|---|---|---|---|---|
| Example 1 | 3.14 | 22.0 | 3.7 | 444 | 553 |
| Example 2 | 3.10 | 22.3 | 3.0 | 365 | 488 |
| Example 3 | 3.13 | 22.1 | 3.5 | 430 | 540 |
| Example 4 | 3.14 | 22.0 | 3.8 | 442 | 556 |
| Example 5 | 3.14 | 21.8 | 3.5 | 436 | 546 |
| Example 6 | 3.16 | 22.5 | 4.0 | 475 | 580 |
| Example 7 | 3.15 | 22.3 | 3.8 | 470 | 572 |
| Example 8 | 3.14 | 22.2 | 3.7 | 462 | 564 |
| Example 9 | 3.16 | 22.4 | 4.0 | 472 | 586 |
| Example 10 | 3.15 | 22.2 | 3.9 | 469 | 573 |
| Example 11 | 3.16 | 22.7 | 4.0 | 422 | 576 |
| Example 12 | 3.12 | 20.8 | 3.5 | 380 | 548 |
| Example 13 | 3.13 | 21.3 | 3.6 | 390 | 567 |
| Example 14 | 3.15 | 22.0 | 3.7 | 411 | 563 |
| Example 15 | 3.12 | 21.3 | 3.4 | 396 | 545 |
| Example 16 | 3.10 | 20.2 | 3.2 | 380 | 527 |
| Comparative Example 1 | 2.85 | 15.2 | 3.2 | 285 | 315 |
| Comparative Example 2 | 3.13 | 21.7 | 3.6 | 391 | 449 |

According to the data in Table 2, it can be seen from Example 1 and Comparative Example 1 that, compared with the traditional preparation method of silicon carbide products of solid phase sintering, the bulk density, hardness, fracture toughness, flexural strength and compressive strength of the silicon carbide heat exchange tube prepared by the method of the present application are obviously improved, indicating that the preparation method of the present application can significantly improve the sintering performance of the silicon carbide product, thereby significantly improving the mechanical properties of the product.

It can be seen from Examples 1-3 that, when the amount of sintering aid is changed, the sintering performance of silicon carbide can be affected, thereby affecting the mechanical properties of the article. Since the amount of the boron carbide used in the present application is relatively small, it is the amount of carbon black that has a major impact on the mechanical properties of silicon carbide products in Examples 1-3. From the experimental data of Examples 1-3, it can be seen that the bulk density, hardness, fracture toughness, flexural strength and compressive strength of the product tend to increase when the amount of the carbon black varies in the range of 0.5-2 wt %. In contrast, when the amount of the carbon black exceeds 2 wt %, the mechanical properties of the product rise slowly, and when the amount of the carbon black is 3 wt %, some mechanical properties of the product tend to decline. The reason lies in that, within a certain range, the addition of the carbon can react with the free silicon and silicon dioxide on the surface of the silicon carbide powder, reduce the impurity content, improve the surface energy and activity of the powder, promote the diffusion of the boron carbide, and promote the sintering of silicon carbide, whereby the compactness of the sintered product is improved. However, when the amount of the carbon continues to increase, the excess carbon will inhibit the sintering of silicon carbide, resulting in a decrease in the compactness and mechanical properties of the sintered article.

It can be seen from Example 4, Example 5, Example 6 and Example 1 that, the amount and the type of plasticizer have a great influence on the mechanical properties of the product. The addition of plasticizer can improve the plasticity of the slip, which is beneficial to improve its formability and sintering performance, thereby improving the compactness and mechanical properties of sintered products. When a single low molecular weight plasticizer is used, the plasticity of the system can be improved, but the bond strength is insufficient, resulting in a decrease in the sintering strength and poor mechanical properties of the article. When a single high molecular weight plasticizer is used, it can provide a strong cohesion, but it causes insufficient mixing of the system, and defects such as cracks are easily generated inside, resulting in insufficient sintering density of the article and in turn leading to the decline of the mechanical properties of the article. Therefore, when the combination of a high molecular weight plasticizer and a low molecular weight plasticizer is used, the plasticity of the system can be improved, which, in cooperation with the pugging process, can improve the mixing uniformity of the slip, and provide a desired bond strength, so as to improve the sintering density of the articles and the mechanical properties of the articles. Especially, it can be seen from Examples 6, 7, and 8 that, when the amount ratio of the high molecular polymer plasticizer to the low molecular weight plasticizer is 1:1-4, the sintered article as obtained has better mechanical properties.

It can be seen from Example 6, Example 9, Example 10 and Comparative Example 2 that the parameters and the order of ageing in the process also have a greater impact on the mechanical properties of the article. In the present application, ageing is used to improve the wettability of the wet powder, improve the mixing uniformity of slip with binders, plasticizers and other raw materials, reduce the hardened particles on the surface of the slip, and improve the plasticity in the pugging process, the density during sintering, thereby significantly improving the mechanical properties of the article.

It can be seen from Example 6, Example 12 and Example 13 that, the drying process has a great influence on the mechanical properties of the article. An improper drying will cause quality problems such as delamination and cracking of the product during sintering, thereby affecting the mechanical properties of the article. A drying method including a combination of the far-infrared drying and the hot air drying can improve the uniformity of drying inside and outside the plain body, avoid the occurrence of delamination and cracks, reduce the internal defects of the article, and help improve the mechanical properties of the article.

It can be seen from Example 6, Example 14, Example 15 and Example 16 that, the heat treatment process has a great influence on the mechanical properties of the article. Compared with a two-stage heat treatment process, a three-stage heat treatment process, together with a reduced heating rate at the stage of carbothermal reduction, can prolong the carbon reduction time and provide a more complete carbon thermal reduction, which is conducive to improving the activity of the powder, promoting the progress of sintering, and improving the density and mechanical properties of the sintered article.

The specific examples are only provided for an explanation of the present application, not intended to impose any limitation to the present application. Those skilled in the art can make modifications to the embodiment as needed without paying creative contribution after reading this specification, which, as long as falls within the scope of the claims of the present application, shall be protected by a patent law.

What is claimed is:

1. A method for preparing a solid-phase-sintered silicon carbide article, comprising the following steps:
    Step S1, mixing a micron-scale silicon carbide powder with a particle size of 3-10 μm with a boron-containing sintering aid and wet grinding to obtain a slurry with a particle size of 0.4-0.8 μm;
    Step S2, adding a water-soluble carbon black and a binder to the slurry, stirring evenly, and spray granulating to obtain a granulated powder of silicon carbide;
    Step S3, mixing the granulated powder of silicon carbide with a plasticizer evenly, adding a lubricant and water, and stirring evenly to obtain a wet powder;
    Step S4, ageing the wet powder to obtain an aged material; and
    Step S5, subjecting the aged material to pugging, extruding, drying and heating;
    wherein the plasticizer comprises a high molecular weight plasticizer with a molecular weight of 150,000-200,000 and a low molecular weight plasticizer with a molecular weight of 4000-6000.

2. The method for preparing a solid-phase-sintered silicon carbide article according to claim 1, wherein an amount of the boron-containing sintering aid is 0.2-0.5 wt % based on a weight of the micron-scale silicon carbide powder; and an amount of the water-soluble carbon black is 0.5-3.0 wt % based on the weight of the micron-scale silicon carbide powder.

3. The method for preparing a solid-phase-sintered silicon carbide article according to claim 1, wherein a temperature for the ageing is 5-10° C., a humidity for the ageing is 40-50%, and a time for the ageing is 12-24 h.

4. The method for preparing a solid-phase-sintered silicon carbide article according to claim 1, wherein the drying comprises a primary drying, the primary drying is far-infrared drying, a temperature for the primary drying is 80-100° C., and a material conveying speed is 0.5-1 m/min.

5. The method for preparing a solid-phase-sintered silicon carbide article according to claim 4, wherein the drying comprises a secondary drying, the secondary drying is hot air drying, a temperature for the secondary drying is 120-150° C., and a time for the secondary drying is 15-20 h.

6. The method for preparing a solid-phase-sintered silicon carbide article according to claim 1, wherein the heating comprises debonding, carbothermal reduction and sintering at 1950-2150° C.; and
    a temperature for the carbothermal reduction is 1400-1600° C., and a holding time of the carbothermal reduction is 0.5-2 h.

7. The method for preparing a solid-phase-sintered silicon carbide article according to claim 1, wherein the heating comprises the following steps:
    performing debonding by heating the aged material to 600-900° C. and holding for 1-3 h;
    performing carbothermal reduction by heating the aged material after the debonding to 1400-1450° C., then to 1550-1600° C. at a rate of 0.5-2° C./min, and holding for 0.5-2 h at a temperature of 1550-1600° C.; and
    performing sintering at high temperature by heating the aged material after the carbothermal reduction to 1950-2150° C., and holding for 2-3 h.

8. The method for preparing a solid-phase-sintered silicon carbide article according to claim 1, wherein the spray granulating is centrifugal spray granulation, an inlet temperature is 220-230° C., and an outlet temperature is 95-100° C.

9. A method for preparing a solid-phase-sintered silicon carbide article, comprising the following steps:
   Step S1, mixing a micron-scale silicon carbide powder with a particle size of 3-10 μm with a boron-containing sintering aid and wet grinding to obtain a slurry with a particle size of 0.4-0.8 μm;
   Step S2, adding a water-soluble carbon black and a binder to the slurry, stirring evenly, and spray granulating to obtain a granulated powder of silicon carbide;
   Step S3, mixing the granulated powder of silicon carbide with a plasticizer evenly, adding a lubricant and water, and stirring evenly to obtain a wet powder;
   Step S4, ageing the wet powder to obtain an aged material; and
   Step S5, subjecting the aged material to pugging, extruding, drying and heating;
   wherein the drying comprises a primary drying and a secondary drying, the primary drying is far-infrared drying, a temperature for the primary drying is 80-100° C., a material conveying speed is 0.5-1 m/min, the secondary drying is hot air drying, a temperature for the secondary drying is 120-150° C., and a time for the secondary drying is 15-20 h.

10. A method for preparing a solid-phase-sintered silicon carbide article, comprising the following steps:
   Step S1, mixing a micron-scale silicon carbide powder with a particle size of 3-10 μm with a boron-containing sintering aid and wet grinding to obtain a slurry with a particle size of 0.4-0.8 μm;
   Step S2, adding a water-soluble carbon black and a binder to the slurry, stirring evenly, and spray granulating to obtain a granulated powder of silicon carbide;
   Step S3, mixing the granulated powder of silicon carbide with a plasticizer evenly, adding a lubricant and water, and stirring evenly to obtain a wet powder;
   Step S4, ageing the wet powder to obtain an aged material; and
   Step S5, subjecting the aged material to pugging, extruding, drying and heating;
   wherein the heating comprises the following steps:
      performing debonding by heating the aged material to 600-900° C. and holding for 1-3 h;
      performing carbothermal reduction by heating the aged material after the debonding to 1400-1450° C., then to 1550-1600° C. at a rate of 0.5-2° C./min, and holding for 0.5-2 h at a temperature of 1550-1600° C.; and
      performing sintering at high temperature by heating the aged material after the carbothermal reduction to 1950-2150° C., and holding for 2-3 h.

* * * * *